United States Patent
Chase

(10) Patent No.: US 8,316,204 B2
(45) Date of Patent: *Nov. 20, 2012

(54) USING VERSIONED POINTERS TO FACILITATE REUSING MEMORY WITH A REDUCED NEED TO RECLAIM OBJECTS THROUGH GARBAGE COLLECTION

(75) Inventor: David R. Chase, Belmont, MA (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/247,786

(22) Filed: Sep. 28, 2011

(65) Prior Publication Data

US 2012/0023306 A1 Jan. 26, 2012

Related U.S. Application Data

(63) Continuation of application No. 11/054,508, filed on Feb. 9, 2005, now Pat. No. 8,051,267.

(51) Int. Cl.
G06F 17/00 (2006.01)
G06F 17/30 (2006.01)

(52) U.S. Cl. ........ 711/170; 711/159; 711/160; 707/813; 707/816; 707/817; 707/820

(58) Field of Classification Search .................. 711/159, 711/160, 170; 707/813, 816, 817, 820
See application file for complete search history.

(56) References Cited

U.S. PATENT DOCUMENTS

| 5,890,176 | A | 3/1999 | Kish |
| 6,247,027 | B1 | 6/2001 | Chaudhry |
| 6,460,067 | B1 | 10/2002 | Chaudhry |
| 7,555,504 | B2 * | 6/2009 | Bixby et al. ........................ 1/1 |
| 7,865,485 | B2 * | 1/2011 | Mullick et al. ............... 707/704 |
| 2002/0073110 | A1 | 6/2002 | Duvillier |

OTHER PUBLICATIONS

Grand, Mark "Pattern Summaries: Object Pool" Sep. 11, 2003, Developer.com, Accessed Feb. 25, 2010, http://www.developer.com/java/other/article.php/626171/pattern-summaries-object-pool.htm.
Gough, Raoul "Dual-mode weak pointers", Archive.org date of Dec. 12, 2002.

(Continued)

*Primary Examiner* — Yaima Campos
*Assistant Examiner* — Samuel Dillon
(74) *Attorney, Agent, or Firm* — Park, Vaughan, Fleming & Dowler LLP; Anthony Jones

(57) ABSTRACT

One embodiment of the present invention provides a system that uses versioned pointers to facilitate reusing memory without having to reclaim the objects solely through garbage collection. The system operates by first receiving a request to allocate an object. Next, the system obtains the object from a pool of free objects, and sets an allocated/free flag in the object to indicate that the object is allocated. The system also increments a version number in the object, and also encodes the version number into a pointer for the object. The system then returns the pointer, which includes the encoded version number. In this way, subsequent accesses to the object through the pointer can compare the version number encoded in the pointer with the version number in the object to determine whether the object has been reused since the pointer was generated.

21 Claims, 6 Drawing Sheets

OTHER PUBLICATIONS

Herlihy, M. et al., "The Repeat Offender Problem: A Mechanism for Supporting Dynamic-Sized, Lock-Free Data Structures" In Proceedings of the 16th international Conference on Distributed Computing (Oct. 28-30, 2002) D. Malkhi, Ed Lecture Notes in Computer Science, vol. 2508, Springer-Verlag, London, 339-353.

Wiebe, D. "A distributed repository for immutable persistent objects" SIGPLAN Not. 21, 11 (Nov. 1986), 453-465.

Greenwald, Michael "Type-Stable Memory Management (TSM)" Stanford University, archive.org date of Jan. 24, 1998, http://www-dsg.stanford.edu/papers/non-blocking-osdi/nodes4.html.

Hans-J. Boehm et al., "Mostly Parallel Garbage Collection", in SIGPLAN Symposium on Programming Language Design and Implementation, pp. 157-164, Jun. 1991.

Agrawal, R. et al., "Object Versioning in Ode" in IEEE Data Engineering, pp. 446-455, IEEE Computer Society Press, Apr. 1991.

* cited by examiner

USING VERSIONED POINTERS TO FACILITATE REUSING MEMORY WITH A REDUCED NEED TO RECLAIM OBJECTS THROUGH GARBAGE COLLECTION

RELATED APPLICATIONS

This application is a continuation application of, and hereby claims priority under 35 U.S.C. §120 to, pending U.S. patent application Ser. No. 11/054,508, entitled "Using Versioned Pointers to Facilitate Reusing Memory with a Reduced Need to Reclaim Objects through Garbage Collection," by inventor David R. Chase, filed on 9 Feb. 2005.

BACKGROUND

The present invention relates to the process of allocating memory in a computer system.

One of the major problems with some programming languages arises from the process of allocating and de-allocating memory. Having the programmer allocate and de-allocate memory provides many advantages when done correctly. However, programmers routinely fail to de-allocate memory when it is no longer needed, and programmers commonly re-use memory that has been de-allocated. Both of these actions can cause a program to behave incorrectly, and can lead to erroneous results or to a "crash" of the computer system.

In order to obviate these problems, designers have created so-called "safe" languages, such as the JAVA™ programming language, Lisp, Modula-3, Perl, Smalltalk, ML, BASIC, C#, and the SafeC programming language. Safe programming languages typically do not trust programmers to recycle storage, because allocation errors can break the language abstraction. Instead, they either make use of a garbage collection mechanism, or use restrictive type systems to ensure that memory is recycled properly. Garbage collection generally runs quickly enough, but often has a substantial storage overhead, which can reduce the amount of storage that is available to do useful computing.

SUMMARY

One embodiment of the present invention provides a system that uses versioned pointers to facilitate reusing memory without having to reclaim the objects solely through garbage collection. The system operates by first receiving a request to allocate an object. Next, the system obtains the object from a pool of free objects, and sets an allocated/free flag within the object to indicate that the object is allocated. The system also increments a version number within the object, and also encodes the version number into a pointer for the object. The system then returns the pointer, which includes the encoded version number. In this way, subsequent accesses to the object through the pointer can compare the version number encoded in the pointer with the version number within the object to determine whether the object has been reused since the pointer was generated.

In a variation of this embodiment, the system receives a request to write data in the object. In response to the request, the system starts a memory transaction that ensures atomicity of a defined group of memory operations. Next, the system reads the object's header, compares the encoded version number in the object's pointer with the version number in the object's header, and determines if the allocated/free flag indicates the object is allocated. If the allocated/free flag indicates the object is allocated, and the encoded version number and the version number match, the system writes the data in the object and completes the memory transaction.

In a further variation, if the encoded version number and the version number do not match, the system reports a failed write.

In a further variation, if the memory transaction fails to complete, the system retries the memory transaction.

In a further variation, the system receives a request to read data from the object. In response to the request, the system reads the object, compares the encoded version number in the object's pointer with the version number in the object's header, and determines if the allocated/free flag indicates the object is allocated. If the allocated/free flag indicates the object is allocated, and the encoded version number and the version number match, the system returns the data. Otherwise, the system returns an error.

In a further variation, the system receives a request to free the object. In response to the request, the system sets the allocated/free flag to free, and if the object's version number is less than a maximum value, the system returns the object to the free pool.

In a further variation, the system receives a request to perform a garbage collection of the pool of free objects. In response, the system sequences through the objects in the pool of free objects and compares the encoded version number in each object's pointer with the version number in the object's header. If the encoded version number in the pointer and the version number in the header match, the system resets the encoded version number in the pointer to zero.

In a further variation, if the encoded version number in the pointer and the version number in the header do not match, the encoded version number in the pointer is either reset to an error value that will never be valid, or the pointer is modified to reference a special error object. All header version numbers on objects that survive garbage collection are reset to zero. Mark-and-sweep collectors accomplish this during their sweep phase; copying collectors accomplish this during their copying phase.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
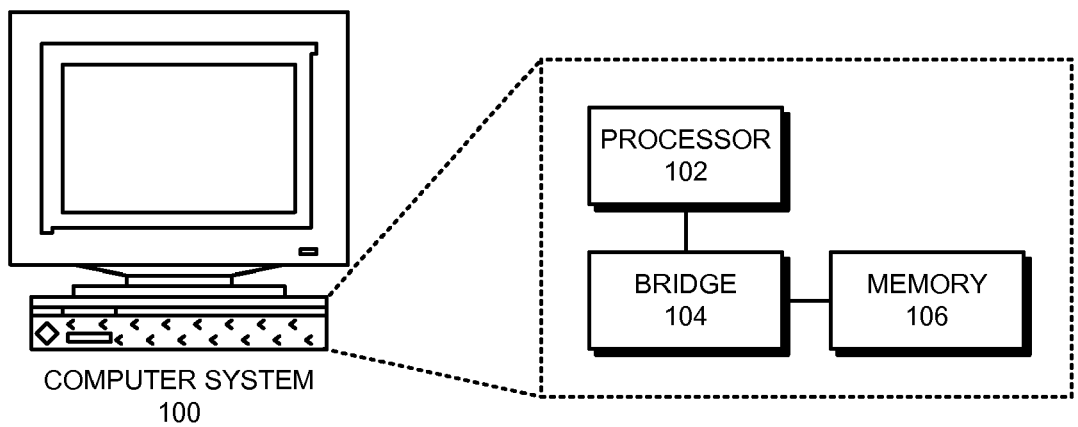
FIG. 1 illustrates a computer system in accordance with an embodiment of the present invention.

FIG. 1 illustrates a computer system 100 in accordance with an embodiment of the present invention. Computer system includes processor 102, bridge 104, and memory 106. Processor 102 can generally include any type of processor, including, but not limited to, a microprocessor, a mainframe computer, a digital signal processor, a personal organizer, a device controller, and a computational engine within an appliance.

Memory 106 includes random-access memory (RAM) which is used to store program instructions and data during execution of a program by processor 102. Bridge 104 couples processor 102 to memory 106 and controls the flow of instructions and data between processor 102 and memory 106.

Memory

Figure 2:
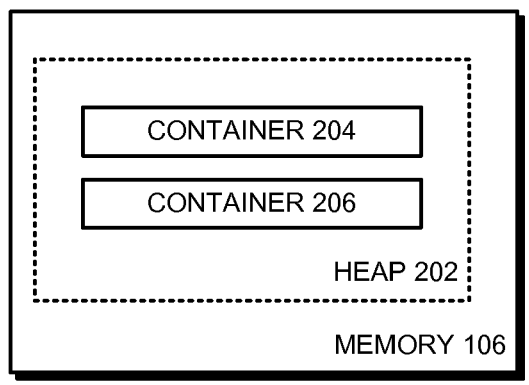
FIG. 2 illustrates a memory organization in accordance with an embodiment of the present invention.

FIG. 2 illustrates a system memory organization in accordance with an embodiment of the present invention. Memory 106 includes heap 202. Heap 202 provides storage for containers 204 and 206. Each container provides storage for a pool of objects, which are the same size. Different containers provide storage for objects of different sizes.

Container

Figure 3:
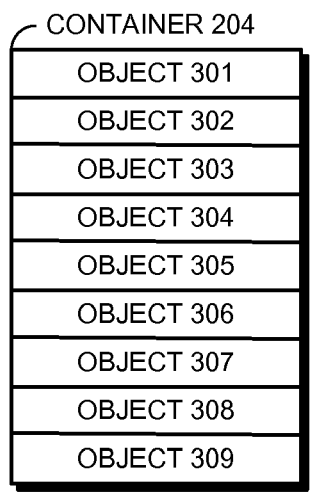
FIG. 3 illustrates a container in accordance with an embodiment of the present invention.

FIG. 3 illustrates a container 204 in accordance with an embodiment of the present invention. Container 204 provides storage for objects 301-309. Note that container 204 can provide storage for more or fewer objects than shown. The structure of each object is described in more detail in conjunction with FIG. 4 below.

Object

Figure 4:
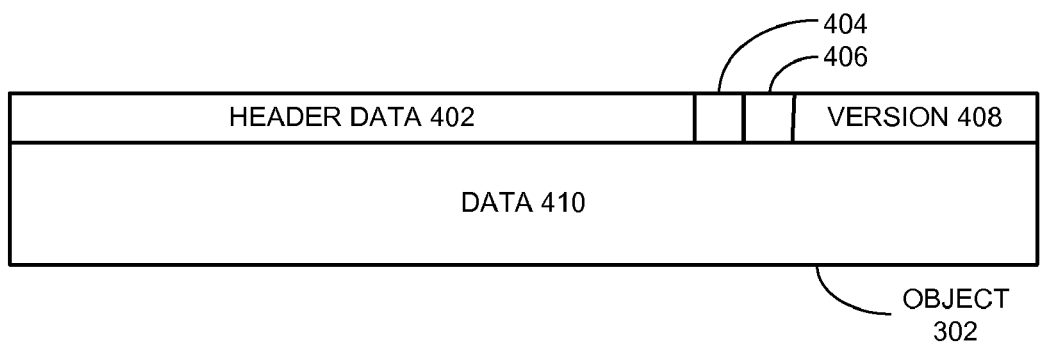
FIG. 4 illustrates an object in accordance with an embodiment of the present invention.

FIG. 4 illustrates an object 302 in accordance with an embodiment of the present invention. Object 302 is exemplary of the objects stored within the various containers in heap 202. Object 302 includes header data 402, allocated/free flag 404, new/old flag 406, version number 408, and data 410. Header data 402 and data 410 are commonly found in objects and will not be discussed further herein.

Allocated/free flag 404 indicates whether object 302 is allocated or not, while new/old flag 406 is a standard flag that is commonly used during garbage collection operations. Version number 408 indicates the version number for the current allocation of object 302. Allocated/free flag 404, new/old flag 406, and version number 408 are described in detail in conjunction with FIGS. 6-11 below.

Pointer

Figure 5:
FIG. 5 illustrates a pointer in accordance with an embodiment of the present invention.

FIG. 5 illustrates a pointer in accordance with an embodiment of the present invention. The pointer includes stale flag 502, new/old flag 504, version number 506, and address 508. Note that for the immediate future, four petabytes ($2^{52}$) is probably a reasonable upper limit on the memory that might be directly addressed in a computer. Given 64-bit pointers, this provides 12 bits for tagging (1 bit each for stale flag 502 and new/old flag 504 and 10 bits for version number 506).

After masking off stale flag 502, new/old flag 504, and version number 506 in the pointer, the pointer includes only address 508, which is the address where the related object is stored.

Creating a Container

Figure 6:
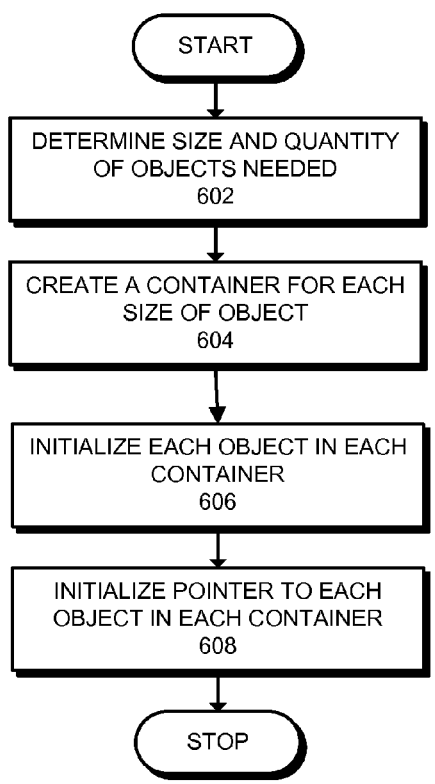
FIG. 6 presents a flowchart illustrating the process of creating a container in accordance with an embodiment of the present invention.

FIG. 6 presents a flowchart illustrating the process of creating a container in accordance with an embodiment of the present invention. The system starts by determining the size and quantity of objects needed for the program to execute efficiently (step 602). Next, the system creates a container within the heap for each size of object (step 604).

After the containers have been created, the system initializes each object in each container (step 606). This initialization includes setting the allocated/free flag to free, the new/old flag to new, and the version number to zero. Finally, the system initializes a pointer to each object in each container (step 608). This initialization involves clearing the stale flag, setting the new/old flag to new, setting the version number to zero, and setting the address to point to the object.

Allocating an Object

Figure 7:
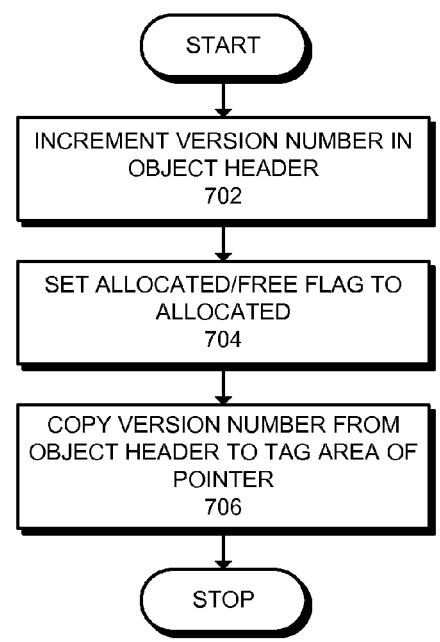
FIG. 7 presents a flowchart illustrating the process of allocating an object in accordance with an embodiment of the present invention.

FIG. 7 presents a flowchart illustrating the process of allocating an object in accordance with an embodiment of the present invention. The system starts by incrementing the version number in the object's header (step 702). Next, the system sets the allocated/free bit to allocated (step 704). Finally, the system copies the version number from the object header to the tag area of the pointer (step 706).

Writing Data

Figure 8:
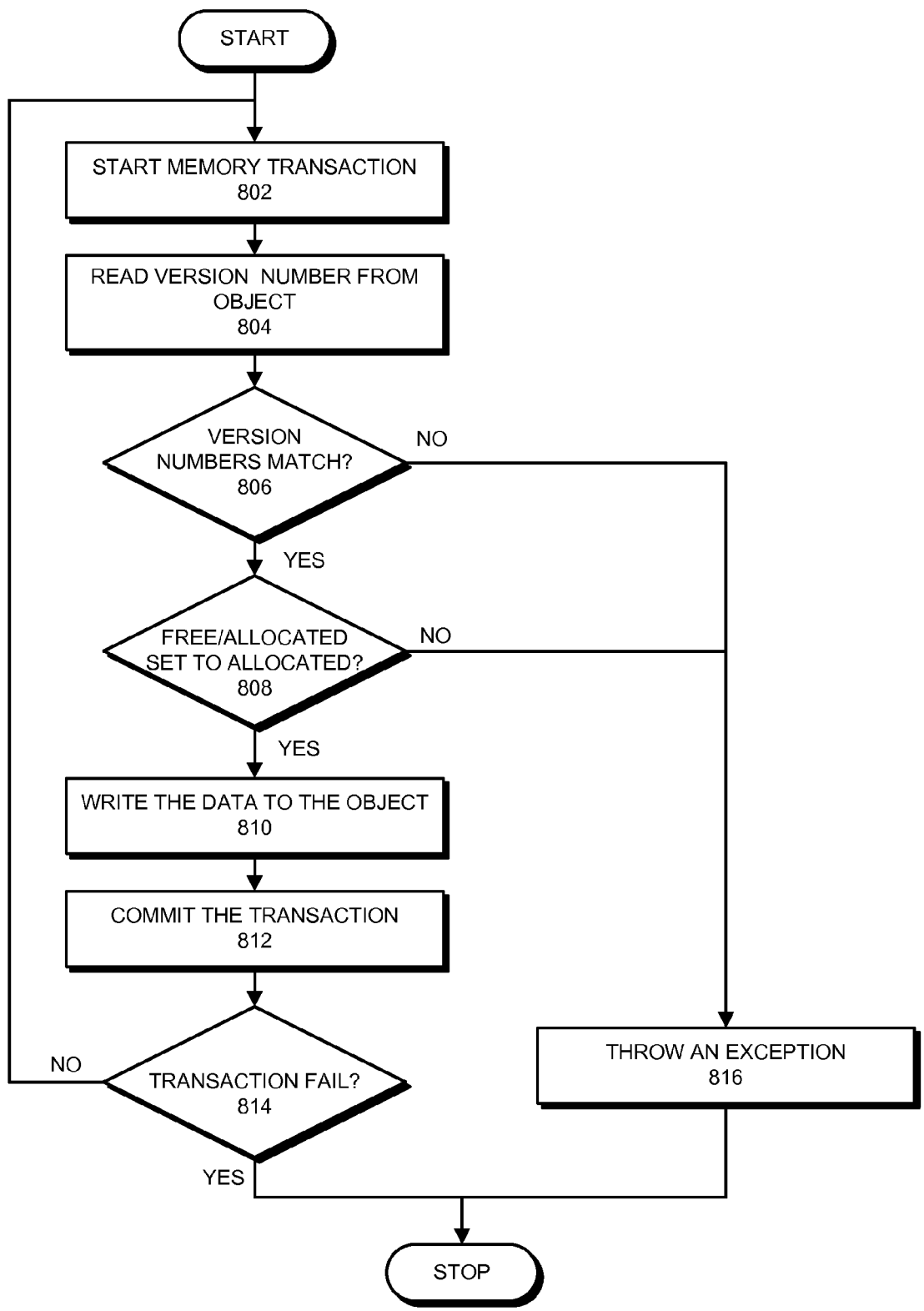
FIG. 8 illustrates a flowchart illustrating the process of writing data to an object in accordance with an embodiment of the present invention.

FIG. 8 illustrates a flowchart illustrating the process of writing data to an object in accordance with an embodiment of the present invention. This process assumes that the computer system includes transactional memory to ensure that given memory transactions are either committed as a block or failed as a block to maintain memory coherence.

The system starts by starting a memory transaction (step 802). Next, the system reads the version number from the object (step 804). After reading the version number from the object, the system compares this version number with the version number stored in the pointer (step 806). If the version numbers are equal, the object has not been reallocated and the system next checks the free/allocated flag to see if the object is allocated (step 806).

If the free/allocated flag is set to allocated in step 808, the system writes the data to the object (step 810). Next, the system commits the transaction (step 812). After committing the transaction, the system determines if the transaction has failed (step 814). If not, the process is complete. Otherwise, the process returns to step 802 to make another attempt.

If the version numbers do not match at step 806 or the free/allocated flag is equal to free at step 808 the system throws an exception (step 816).

Reading Data

Figure 9:
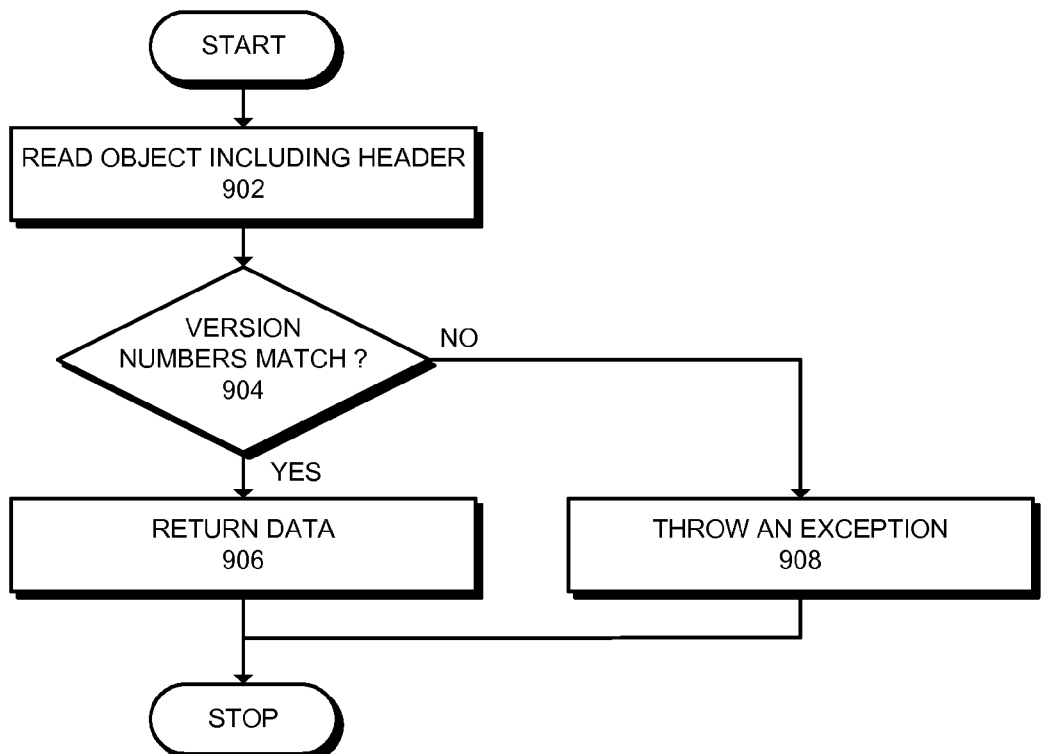
FIG. 9 presents a flowchart illustrating the process of reading data from an object in accordance with an embodiment of the present invention.

FIG. 9 presents a flowchart illustrating the process of reading data from an object in accordance with an embodiment of the present invention. The system starts by reading the object including the header (step 902). Next, the system determines if the version number in the header matches the version number in the pointer (step 904). If the version numbers match, the system returns the data (step 906). Otherwise, the system throws an exception (step 908).

De-Allocating an Object

Figure 10:
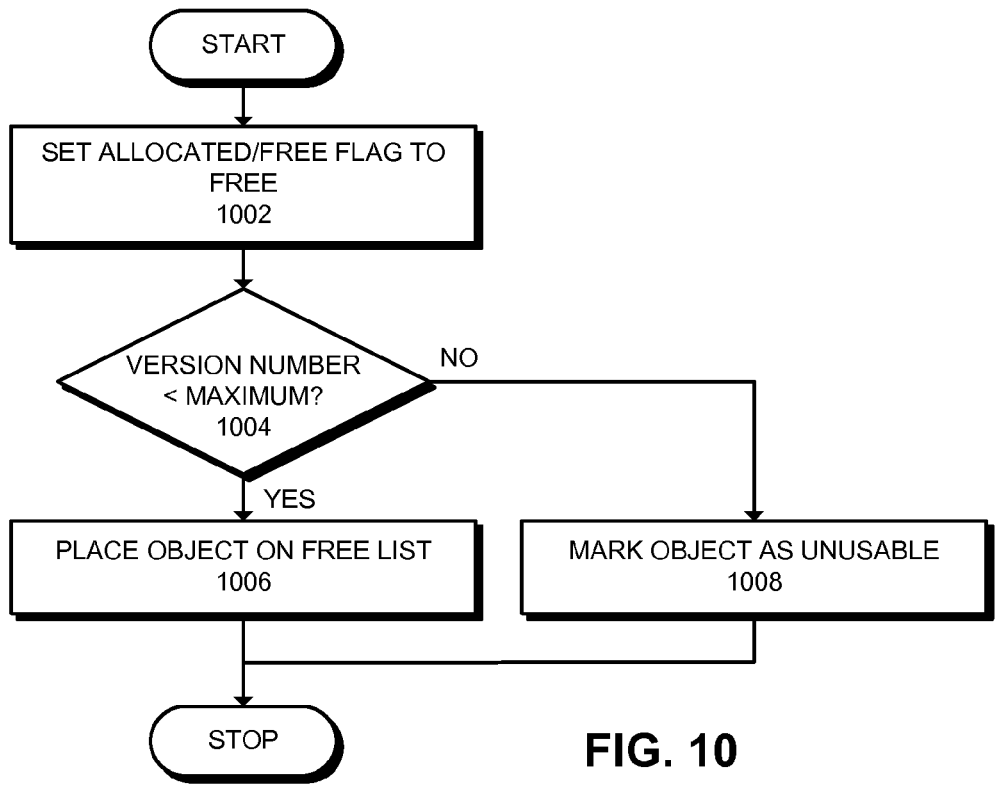
FIG. 10 presents a flowchart illustrating the process of de-allocating an object in accordance with an embodiment of the present invention.

FIG. 10 presents a flowchart illustrating the process of de-allocating an object in accordance with an embodiment of the present invention. The system starts by setting the allocated/free flag to free in the object's header (step 1002). Next, the system determines if the version number is less than a maximum allowed version number (step 1004). If not, the system places the object on a free list of objects (step 1006). Otherwise, the system marks the object as unusable (step 1008). Note that this can be accomplished in any number of ways—for example, by setting the version number to a specific reserved value. Note also that object marked as unusable can be reclaimed during a garbage collection as described below in conjunction with FIG. 11.

Garbage Collection

Figure 11:
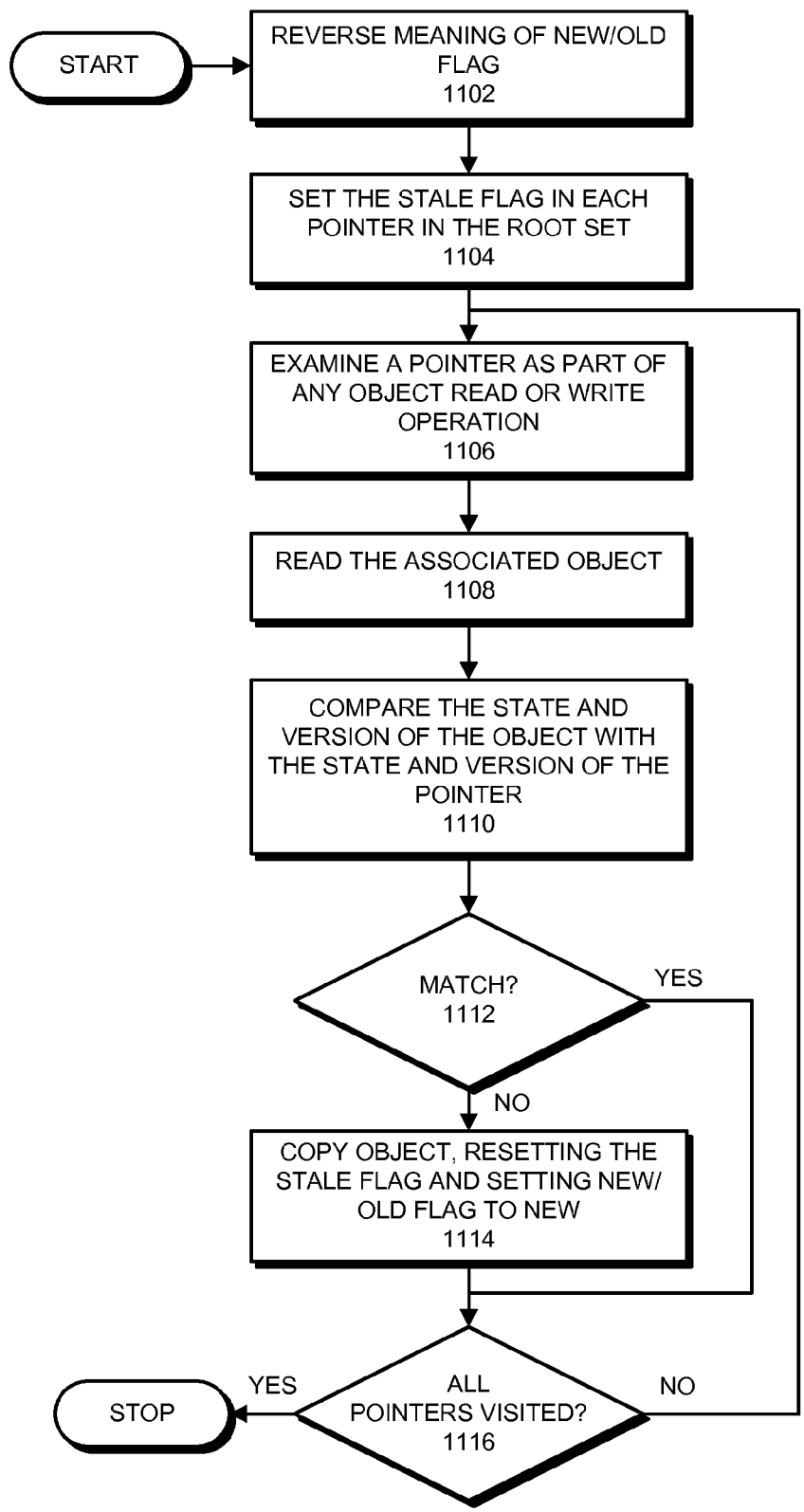
FIG. 11 presents a flowchart illustrating the process of performing garbage collection in accordance with an embodiment of the present invention.

FIG. 11 presents a flowchart illustrating the process of performing garbage collection in accordance with an embodiment of the present invention. Note that the garbage collection operation can be performed by any available technique, one of which is described herein. A practitioner with ordinary skill in the art can readily adapt this invention to other garbage collectors. The system starts by reversing the meaning of the new/old flag (step 1102). Since all of the objects were marked as new, by reversing the meaning of the new/old flag, all objects become old. Next, the system sets the stale flag in each pointer in the root set (step 1104).

The system then examines a pointer as part of any object read or write operation (step 1106). Next, the system reads the object associated with the pointer (step 1108). After reading the object, the system compares the state and version of the object with the state and version of the pointer (step 1110). This comparison involves masking the header so that only the allocated/free flag, the old/new flag, and the version number are present. It also involves arithmetically shifting the stale flag, the new/old flag, and the version number to the right most position in the pointer. Note that using an arithmetic shift ensures that no stale pointer will match.

If there is no match (step 1112), the system copies the object, resets the stale flag, and sets the new/old flag to new (step 1114). Note that the only way for a match to occur is for the pointer to be not stale, the object to be allocated, and the version number to match. After copying the object at step 1114 or if there is a match at step 1112, the system determines if all pointers have been visited (step 1116). If not, the process returns to step 1106 to select another pointer. Otherwise, the process is terminated.

Garbage Collection Techniques

The following garbage collection techniques are based on existing techniques for mark-and-sweep, copying-compacting, and Appel-Ellis-Li-like garbage collectors. Modifications necessary to support versioned pointers are underlined.

Common Code

The following examples provide pointer operations that are common to several garbage collection implementations. Note that other bit assignments may be more efficient for specific garbage collections implementations.

Return true if and only if a pointer is obsolete with respect to the object it references.

```
obsolete(P:pointer):pointer
version(P) !=header version(*P)||freed(P)
```

Construct a version-tagged pointer from an address and tag value.

```
tagged pointer(A:address, T:tag):pointer=A+(T<<52)
```

Extract the version number (bits 52-63) from a pointer.

```
version(P:pointer):tag=P>>>52
```

Extract the version number (bits 0-11) from an object header word.

```
header version(W:word):tag=return P&0xfff
```

Extract the freed bit (12) from an object header word

```
freed(W:word):Boolean=(P>>12)&1
```

Allocate memory from the free list for a particular size.

```
allocate(size:integer):pointer
    transactionally
        I = frelists[size]
        if I empty then refill I
        remove o from I
        set freed(o) = false
        return 0
    end
```

Free a previously allocated object and return it to the appropriate free list.

```
free(P:pointer) =
    transactionally
        O = Ps object
        size = size of O
        v = version(P)
        if v < MAXIMUM VERSION then
            if not obsolete(P) then
                version(O) = version(O) + 1
                freed(O) = true
                put O on freelists[size]
            else report error
        else set freed(o) = true
    end
```

Write barrier for all three collectors (new with versioned pointers). Translation of P.f=X.

```
write barrier(P:pointer) =
    transactionally
        A = addrbits(P)
        To = otagbits(*A)
        Tp = ptagbits(P)
        if To != Tp then
            if version(To) != version(Tp) then throw error
            if freed(To) != freed(Tp) then throw error
        *(A+f) = X
        return
```

Read barrier for mark-sweep and copying-compacting. Translation of X=P.f.

```
read barrier(P:pointer):data =
    transactionally
        A = addrbits(P)
        X = *(A+f)
        To = otagbits(*A)
        Tp = ptagbits(P)
        if To != Tp then
            if version(To) != version(Tp) then throw error
            if freed(To) != freed(Tp) then throw error
        return X
```

Concurrent Collector Operations
    Extract tag bits from an object header.
    otagbits(W:word)=W&0x3fff
    Extract tag bits from a pointer.
    ptagbits(W>>>52)+(W>>(51-13) & 0x2000)
    Extract the age bit (13) from an object header word or a tag.
    age(W:word or tag):Boolean=(W>>13) & 1
    Extract the age bit (51) from a pointer.
    age(P:pointer):Boolean=W>>51) & 1
    Invert an age.
    flip(b:Boolean)=b XOR 1
Copying Collector Operations
    Has the object been forwarded?
    forwarded(W:word):Boolean=(W>>14) & 1
    The address to which the object was forwarded (assume 8-byte alignment).
    forward(W:word):Address=(W>>>12) & 0xffffFFFFffffFFF8
    Mark-and Sweep garbage collection with versioned pointers.

```
mark_sweep_gc( ) =
    bag = new Bag
    //process registers
    foreach register R
        R = process_ms(R, bag)
    //process every pointer in bag
    while bag not empty
        take P from bag
        foreach pointer index I of Ps object
            P[i] = process_ms(P[i], bag)
    //sweep
    foreach object(o) in heap
        version(o) = 0
        if visited(o) then reset viited(o)
        else
            set freed(o) = true
            put o on freelists[size(o)]
end
process_ms(P:pointer, bag:Bag):pointer =
    if obsolete(P) then return error pointer
    else if not visited(P) then
        set visited in Ps objects header
        put P in bag
        return tagged pointer(address(P), o)
```

Copying-compacting collection with versioned pointers.

```
scanned:address
unscanned:address
copy_compact_gc( ) =
    scanned = unscanned = address of new memory
    foreach register R
        R = process_cc(R)
    while scanned < unscanned do
        P = scanned
        O = object at P
        scanned = scanned + size(O)
        foreach pointer index I of O
            P[i] = process_cc(P[i])
end
process_cc(P:pointer):pointer =
    if obsolete(P) then return error pointer
    else if forwarded(P) then
        return tagged pointer(forward(*P), 0)
    else
        O = object at P
        size = size(P)
        F = unscanned
        unscanned = unscanned + size
        copy O form P to F
```

```
        set version of copied object at F to 0
        set forward(*P) to F
        return tagged pointer(F, 0)
end
```

Appel-Ellis-Li-style concurrent collection with versioned pointers.

```
scanned, unscanned:address
ael_integrated_gc( ) =
    scanned = unscanned = address of new memory
    foreach register R
        R = process_ael(R) //old pointer become new
    end
    process_ael(P:pointer):pointer =
        if obsolete(P) then return error pointer
        else if forwarded(*P) then
            return age_tagged_pointer(forward(*P),
                                       0, flip(age(P)))
        else
            O = object at P
            size – size(O)
            F = unscanned
            unscanned = unscanned + size
            copy O from P to F
            set version of copied object at F to 0
            set age of copied object at F to age(P)//old age
            set forward(*P) to F
            return age_tagged_pointer(F, 0, flip(age(P)))
    end
```

Translation of X=P.f.

```
read_barrier(P:pointer):data =
    transactionally
        A = addrbits(P)
        X = *(A + f)
        To = otagbits(*A)
        Tp = ptagbits(P)
        if To != Tp then
            if version(To) != version(Tp) then throw error
            if freed(To) != freed(Tp) then throw error
            if age(To) != age(Tp) then promote_object(A, Tp)
        return X
    promote_object(A:address, T:tag) =
        foreach pointer index I of object at A do
            A[i] = process_ael(A[i])
        set age of object at A to age(Tp)
```

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using versioned pointers to facilitate reuse of memory, comprising:
    receiving a request to allocate an object;
    obtaining the object from a pool of free objects, wherein each object in the pool of free objects is indicated by a corresponding pointer, and wherein the object includes a version number for a current allocation of the object;
    setting an allocated/free flag in the object to indicate that the object is allocated and encoding the version number for the current allocation of the object into the pointer to the object;

returning the pointer to the object; and
using the pointer to the object to perform one or more subsequent accesses to the object, wherein performing the accesses comprises comparing the version number encoded in the pointer with the version number in the object to determine whether the object has been referenced erroneously.

2. The method of claim 1, further comprising:
receiving a request to write data in the object;
starting a memory transaction, wherein a memory transaction ensures atomicity of a defined group of memory operations;
comparing the encoded version number in the pointer to the object with the version number in the object;
determining if the allocated/free flag indicates the object is allocated;
if the allocated/free flag indicates the object is allocated, and if the encoded version number and the version number in the object match, writing the data in the object; and
completing the memory transaction.

3. The method of claim 2, wherein if the encoded version number and the version number in the object do not match, reporting a failed write.

4. The method of claim 2, wherein if the memory transaction fails to complete, retrying the memory transaction.

5. The method of claim 1, further comprising:
receiving a request to read data from the object;
reading the object;
comparing the encoded version number in the pointer to the object with the version number in the object;
determining if the allocated/free flag indicates the object is allocated; and
if the allocated/free flag indicates the object is allocated, and the encoded version number and the version number in the object match,
returning the data, and otherwise,
returning an error.

6. The method of claim 1, further comprising:
receiving a request to free the object;
setting the allocated/free flag to free;
incrementing the version number in the object; and
if the version number in the object is less than a maximum value, returning the object to a free pool.

7. The method of claim 1, wherein if the encoded version number in the pointer and the version number in the object do not match when subsequently accessing the object through the pointer, the method further comprises resetting the encoded version number in the pointer to one of an error value that will never be valid or to reference a special error object.

8. The method of claim 1, wherein the method further comprises:
receiving a request to perform a garbage collection of the pool of free objects; and
responsive to receiving the request, for each free object in the pool of free objects:
comparing an encoded version number in a pointer to the free object with a version number in the free object; and
when the encoded version number in the pointer to the free object and the version number in the free object match, setting the encoded version number in the pointer to the free object to zero.

9. A non-transitory computer-readable storage medium storing instructions that when executed by a computer cause the computer to perform a method for using versioned pointers to facilitate reuse of memory, the method comprising:
receiving a request to allocate an object;
obtaining the object from a pool of free objects, wherein each object in the pool of free objects is indicated by a corresponding pointer, and wherein the object includes a version number for a current allocation of the object;
setting an allocated/free flag in the object to indicate that the object is allocated and encoding the version number for the current allocation of the object into the pointer to the object;
returning the pointer to the object; and
using the pointer to the object to perform one or more subsequent accesses to the object, wherein performing the accesses comprises comparing the version number encoded in the pointer with the version number in the object to determine whether the object has been referenced erroneously.

10. The computer-readable storage medium of claim 9, the method further comprising:
receiving a request to write data in the object;
starting a memory transaction, wherein a memory transaction ensures atomicity of a defined group of memory operations;
comparing the encoded version number in the object's pointer with the version number in the object;
determining if the allocated/free flag indicates the objects is allocated;
if the allocated/free flag indicates the objects is allocated, and if the encoded version number and the version number in the object match, writing the data in the object; and
completing the memory transaction.

11. The computer-readable storage medium of claim 10, wherein if the encoded version number and the version number in the object do not match, reporting a failed write.

12. The computer-readable storage medium of claim 10, wherein if the memory transaction fails to complete, retrying the memory transaction.

13. The computer-readable storage medium of claim 9, the method further comprising:
receiving a request to read data from the object;
reading the object;
comparing the encoded version number in the object's pointer with the version number in the object;
determining if the allocated/free flag indicates the object is allocated; and
if the allocated/free flag indicates the object is allocated, and the encoded version number and the version number in the object match,
returning the data, and otherwise,
returning an error.

14. The computer-readable storage medium of claim 9, the method further comprising:
receiving a request to free the object;
setting the allocated/free flag to free;
incrementing the version number in the object; and
if the version number in the object is less than a maximum value, returning the object to a free pool.

15. The computer-readable storage medium of claim 9, wherein if the encoded version number in the pointer and the version number in the object do not match when subsequently accessing the object through the pointer, the method further comprises resetting the encoded version number in the pointer to one of an error value that will never be valid or to reference a special error object.

16. The computer-readable storage medium of claim 9, wherein the method further comprises:

receiving a request to perform a garbage collection of the pool of free objects; and responsive to receiving the request, for each free object in the pool of free objects:

comparing an encoded version number in a pointer to the free object with a version number in the free object; and when the encoded version number in the pointer to the free object and the version number in the free object match, setting the encoded version number in the pointer to the free object to zero.

17. An apparatus for using versioned pointers to facilitate reuse of memory, comprising:

a processor configured to perform operations for:

receiving a request to allocate an object;

obtaining the object from a pool of free objects, wherein each object in the pool of free objects is indicated by a corresponding pointer, and wherein the object includes a version number for a current allocation of the object;

setting an allocated/free flag in the object to indicate that the object is allocated and encoding the version number for the current allocation of the object into the pointer to the object;

returning the pointer to the object; and using the pointer to the object to perform one or more subsequent accesses to the object, wherein performing the accesses comprises comparing the version number encoded in the pointer with the version number in the object to determine whether the object has been referenced erroneously.

18. The apparatus of claim 17, wherein the processor is further configured to perform operations for:

receiving a request to write data in the object;

starting a memory transaction, wherein a memory transaction ensures atomicity of a defined group of memory operations;

comparing the encoded version number in the object's pointer with the version number in the object;

determining if the allocated/free flag indicates the object is allocated;

if the allocated/free flag indicates the object is allocated, and if the encoded version number and the version number in the object match, writing the data in the object; and completing the memory transaction.

19. The apparatus of claim 18, wherein if the encoded version number and the version number in the object do not match, the processor is configured to report a failed write.

20. The apparatus of claim 18, wherein if the memory transaction fails to complete, the processor is configured to retry the memory transaction.

21. The apparatus of claim 17, wherein the processor is further configured to perform operations for:

receiving a request to perform a garbage collection of the pool of free objects; and in response to receiving the request, for each free object in the pool of free objects:

comparing an encoded version number in a pointer to the free object with a version number in the free object; and when the encoded version number in the pointer to the free object and the version number in the free object match, setting the encoded version number in the pointer to the free object to zero.

* * * * *